United States Patent Office 3,392,595
Patented July 16, 1968

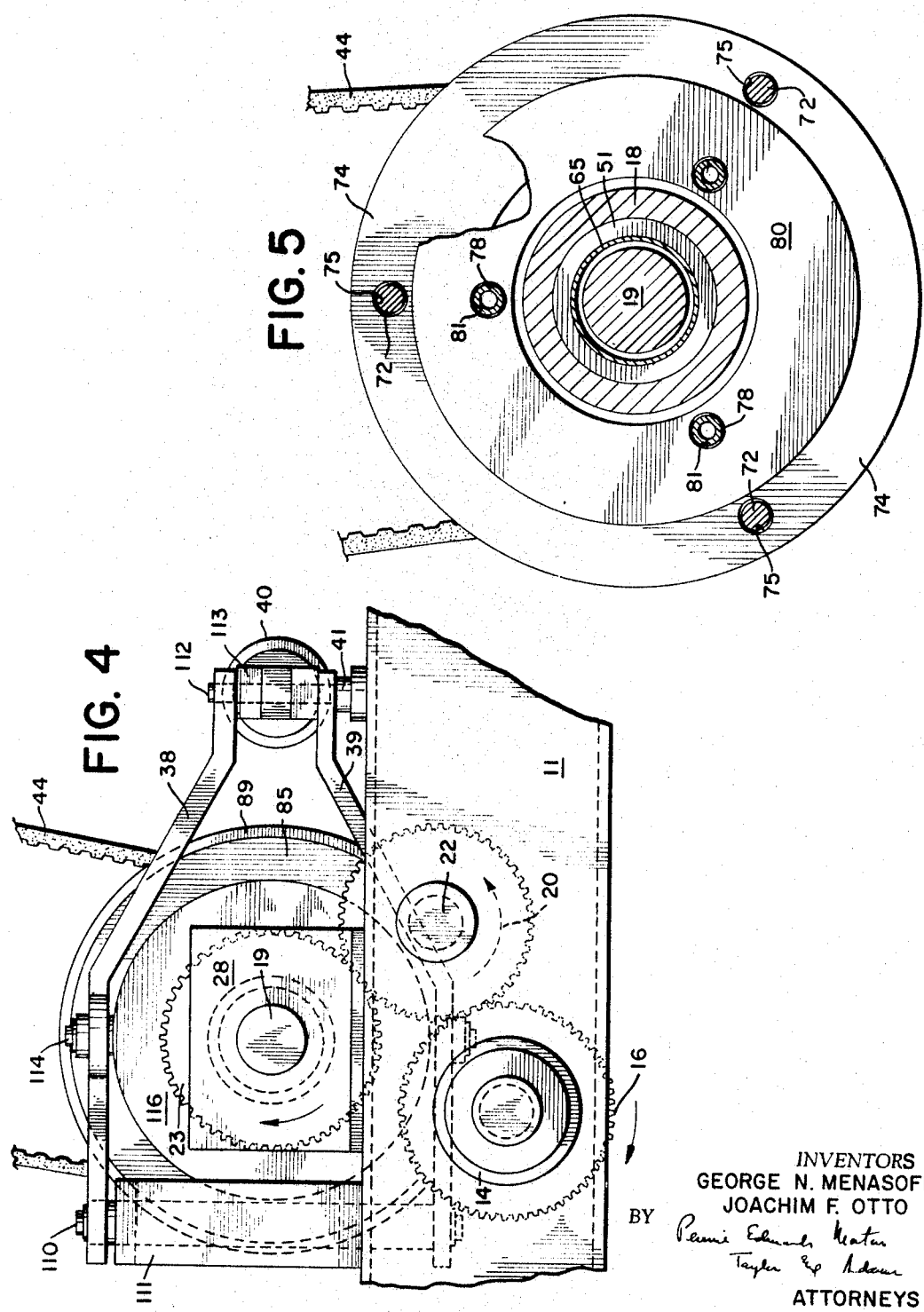

3,392,595
REVERSING MECHANISM
George N. Menasoff, Tarrytown, and Joachim F. Otto, Hastings-on-Hudson, N.Y., assignors to Anaconda Wire and Cable Company, a corporation of Delaware
Filed Aug. 19, 1965, Ser. No. 480,882
5 Claims. (Cl. 74—377)

ABSTRACT OF THE DISCLOSURE

Apparatus is disclosed that is capable of rapidly reversing the direction of rotation of a rotating part. The apparatus comprises a main drive shaft that is rotated in one direction by a prime mover, a left hand drive shaft driven by the main drive shaft, and a right hand drive shaft also driven through an idler gear by the main drive shaft. A rotatably mounted sprocket is disposed between the two drive shafts in axial alignment therewith. Left hand clutch means comprising a plurality of interleaved clutch discs are connected to the left hand drive shaft and to the left hand side of the sprocket, and right hand clutch means comprising a plurality of interleaved clutch discs are connected to the right hand drive shaft and the right hand side of the sprocket. Reversible clutch control means are provided which alternately engage the left hand clutch means and the right hand clutch means in order to alternate the direction of rotation of the sprocket.

It is sometimes necessary in the manufacturing and related arts to rapidly and repeatedly reverse the direction of rotation of a rotating part, and a great variety of direction of rotation reversing mechanisms have heretofore been devised to carry out this function, For example, in the manufacture of certain kinds of electrical cable, and in particular a certain type of communications cable, the direction in which the helically wound insulated wire components of the cable are laid in the cable assembly is frequently and regularly reversed, and therefore it is necessary to rapidly and repeatedly reverse the direction of rotation of the wire winding means of the cable making machinery. Existing apparatus for rapidly reversing the direction of rotation of rotating parts heretofore known in the art have been found to be too cumbersome, to be too slow in effecting the rapid change in direction of rotation required, to be insufficiently sturdy to stand up to the severe service to which the reversing apparatus is subjected, or for other reasons to be unsuitable for use in the manufacture of the aforementioned communications cable. Accordingly, in order to overcome the aforementioned shortcomings and inadequacies of the reversing mechanisms of the prior art, we have now devised a sturdy new reversing mechanism which is adapted to frequently and almost instantaneously reverse the direction of rotation of a rotating part, and in particular the wire winding means of cable making machinery.

Our new apparatus for rapidly reversing the direction of rotation of a rotating part comprises a rotatably mounted main drive shaft adapted to be rotated in one direction by a prime mover, left hand drive means driven by said main drive shaft adapted to rotate a left hand drive shaft in one direction and right hand drive means driven by said main drive shaft adapted to rotate a right hand drive shaft in the opposite direction. A rotatably mounted sprocket is disposed between the left hand drive shaft and the right hand drive shaft, the sprocket and the left and right hand drive shafts being rotatably mounted so that the axes of rotation of these three parts are in alignment with each other. Left hand drive clutch means are mounted on the left hand drive shaft adapted to frictionally engage cooperating left hand sprocket clutch means mounted on the left hand end of the sprocket, and right hand drive clutch means are mounted on the right hand drive shaft adapted to frictionally engage cooperating right hand sprocket clutch means mounted on the right hand end of the sprocket. Direction of rotation control means are connected to the left hand drive clutch means and to the right hand drive clutch means, said direction of rotation control means being adapted to frictionally engage the left hand clutch means while disengaging the right hand clutch means and to frictionally engage the right hand clutch means while disengaging the left hand clutch means, whereby the sprocket rotates in the direction of rotation of the particular drive means and the associated clutch means placed in frictional engagement by the direction of rotation control means.

Our new reversing mechanism will be better understood from the following description of an advantageous embodiment thereof in conjunction with the following drawings of which:

FIG. 4 is an end elevation of the right hand end of the apparatus shown in FIG. 1; and FIG. 5 is a cross-sectional view along line 5—5 of FIG. 3.

Figure 1:
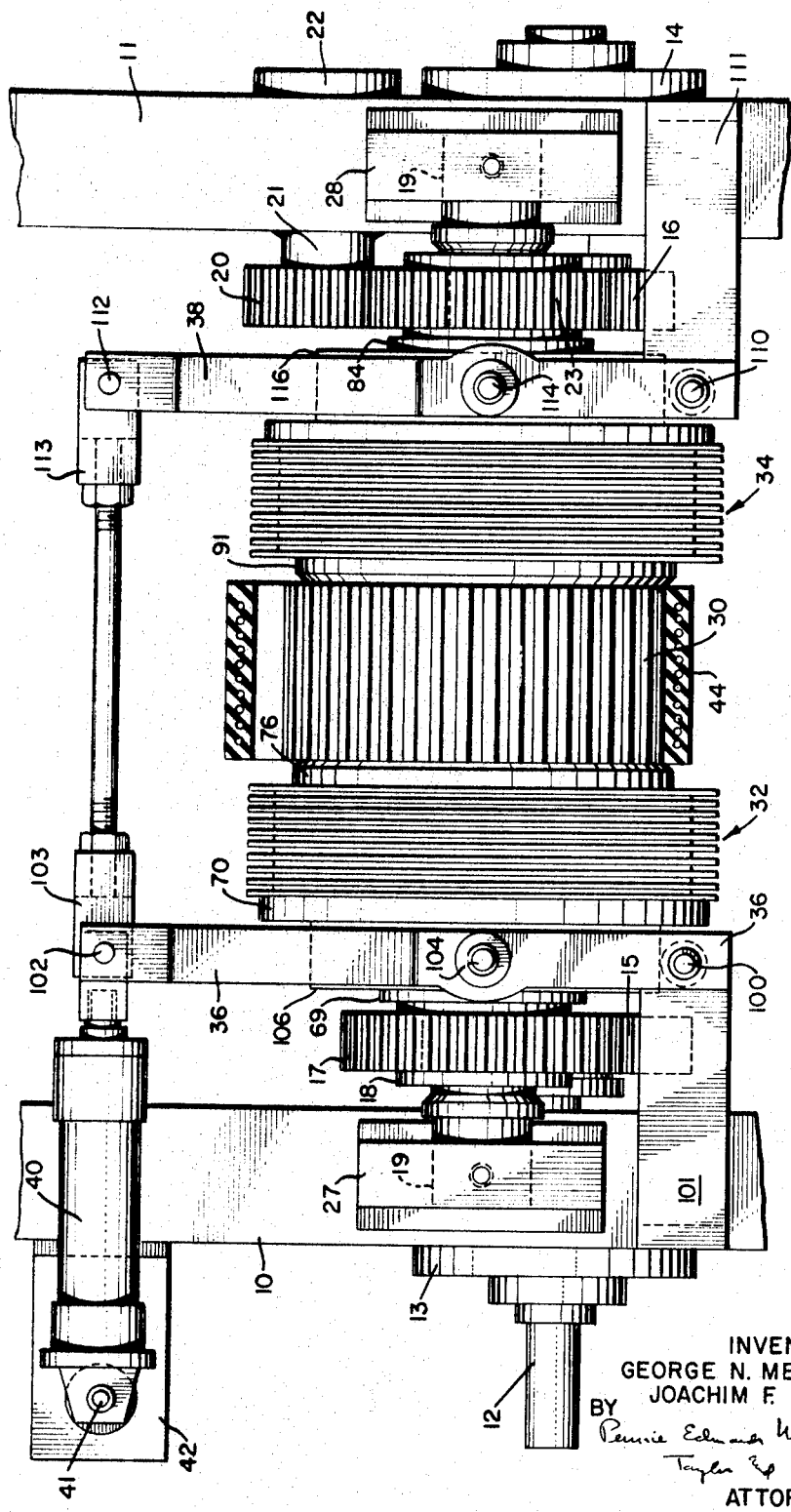
FIG. 1 is a top elevation of the advantageous embodiment of our new reversing gear assembly.
Figure 2:
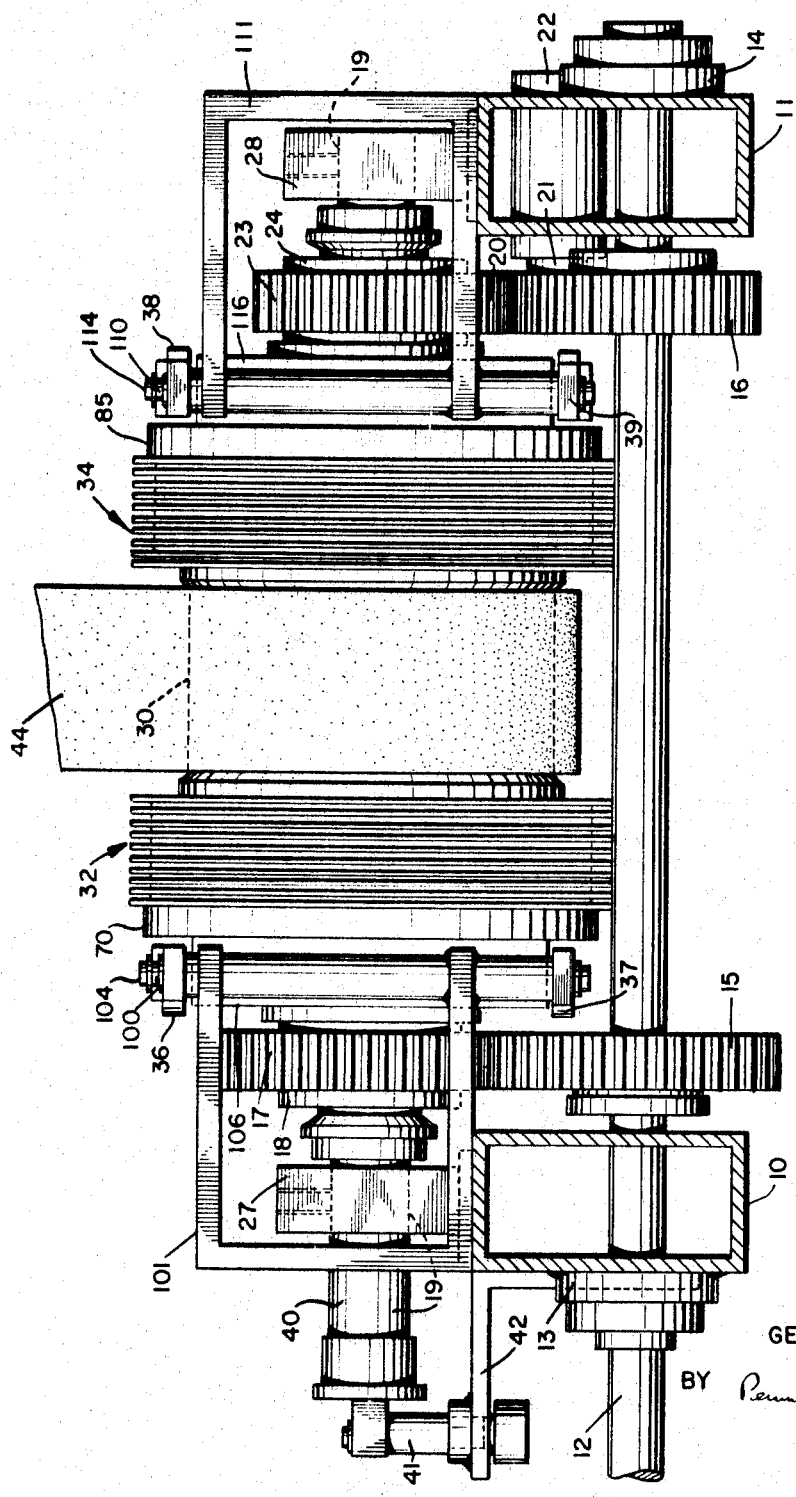
FIG. 2 is a side elevation of the reversing gear assembly shown in FIG. 1.

The advantageous embodiment of our new reversing clutch assembly herewith described is securely mounted on two laterally disposed frame members 10 and 11 that preferably have a hollow rectangular cross-section, as clearly shown in FIGS. 1 and 2 of the drawing. A main drive shaft 12 extends through the two frame members and is rotatably mounted in bearings 13 and 14 which, in turn, are mounted on the frame members 10 and 11, respectively. A first main drive gear 15 is securely mounted on the drive shaft 12 near the frame member 10 and a second drive gear 16 is securely mounted on the drive shaft 12 adjacent the frame member 11. The first drive gear 15 at one end of the main drive shaft 12 engages a left hand drive gear 17 which is securely mounted on a left hand drive shaft 18 which, in turn, is rotatably mounted on a stationary bearing support shaft 19. The second main drive gear 16 at the opposite end of the main drive shaft 12 engages a right hand idler gear 20 which is securely mounted on a right hand idler shaft 21 which, in turn, is rotatably mounted in shaft bearing 22, and right hand idler gear 20 engages a right hand drive gear 23 which is securely mounted on a right hand drive shaft 24 which, in turn, is rotatably mounted on the stationary bearing support shaft 19. The first main drive gear 15 and the left hand drive gear 17 together comprise left hand drive means adapted to rotate the left hand drive shaft 18 in one direction, and the second main drive gear 16, the right hand idler gear 20 and the right hand drive gear 23 together comprise right hand drive means adapted to rotate the right hand drive shaft 24 in the opposite direction, when the main drive shaft 12 is rotated in a given direction. Thus, when the main drive shaft 12 is rotated in one direction by a prime mover (for example, by an electric motor) the left hand drive shaft 18 and the rotating parts associated therewith will be rotated in one direction while the right hand drive shaft 24 and the rotating parts associated therewith will be rotated in the opposite direction, as hereinafter more fully described.

The ends of the stationary bearing support shaft 19 are firmly secured to support members 27 and 28 which, in turn, are mounted on the frame members 10 and 11, respectively. In addition to the left hand drive shaft 18 and the right hand drive shaft 24, a sprocket 30 is rotatably mounted on the bearing support shaft 19 between the drive shafts 18 and 24 so that the axes of rotation of the two drive shafts and the sprocket are aligned with each other. Left hand clutch means comprising an assembly of interleaved clutch discs 32 is associated with the left hand drive shaft 18 and the left hand end of the sprocket 30, and right hand clutch means comprising a similar assembly 34 of interleaved clutch discs is associated with the right hand drive shaft 24 and the right hand end of the sprocket 30. When the assembly 32 of clutch discs is frictionally engaged in the manner hereinafter more fully described the sprocket 30 will rotate in the same direction as the direction of rotation of the left hand drive shaft 18, and when the assembly 34 of clutch discs is frictionally engaged, as also hereinafter more fully described, the sprocket 30 will rotate in the opposite direction corresponding to the direction of rotation of the right hand drive shaft 24. The assembly of clutch discs 32 and 34 are frictionally engaged and disengaged, as the case may be, by longitudinal movement of the pivoted left hand clutch control levers 36 and 37 and the right hand clutch control levers 38 and 39 which, in turn, are moved longitudinally by means of the double-acting air cylinder 40. The air cylinder 40 is mounted on the cylinder pivot pin 41 and the cylinder support bracket 42 which, in turn, is mounted on the frame member 10 as clearly shown in FIGS. 1 and 2 of the drawing. A laterally grooved belt 44 engages the teeth of the sprocket 30 and transmits the rotational movement of the sprocket to the rotating part (not shown) the direction of rotation of which is to be rapidly and repeatedly reversed.

Figure 3:
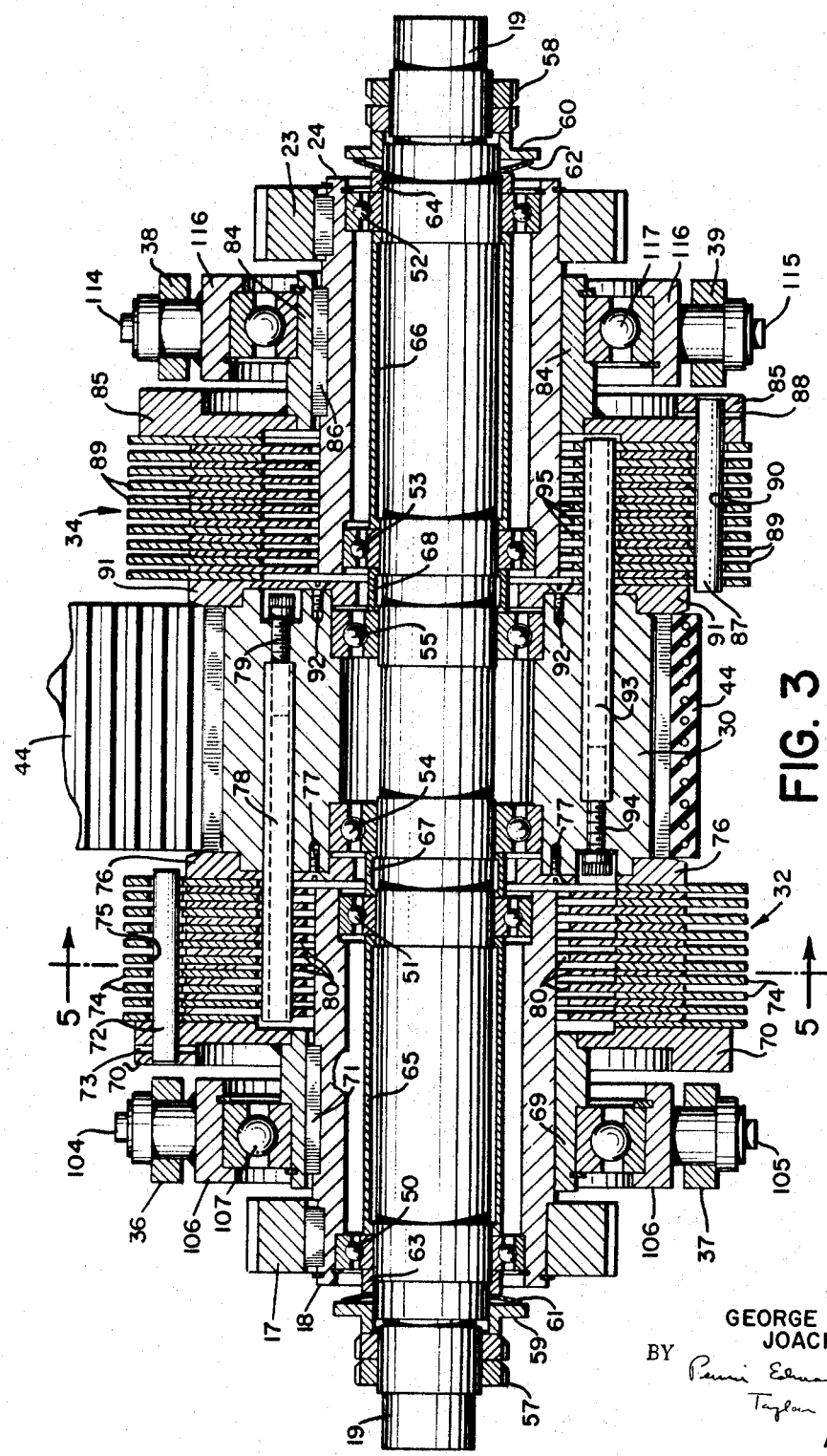
FIG. 3 is a sectional view of the clutch shaft assembly of the apparatus of FIG. 1.

Referring now to FIG. 3 of the drawing which is a sectional view of the bearing support shaft assembly of the preferred embodiment of our apparatus, the left hand drive shaft 18 is rotatably mounted on the stationary bearing support 19 by means of the ball bearings 50 and 51, the right hand drive shaft 24 is rotatably mounted on the bearing support shaft 19 by means of the ball bearings 52 and 53 and the sprocket 30 is rotatably mounted on the bearing support shaft 19 by means of the ball bearings 54 and 55. The ball bearings 50 through 55, and the rotating parts mounted thereon, are held in position longitudinally on the bearing support shaft 19 by means of the lock nuts 57 and 58, the shouldered collar members 59 and 60, the annular spring members 61 and 62 and the annular bearing spacer members 63, 64, 65, 66, 67 and 68, as clearly shown in FIG. 3 of the drawing.

A left hand clutch pressure plate base member 69 and clutch pressure plate 70 are mounted on the left hand drive shaft 18, the pressure plate base member 69 being keyed to the drive shaft 18 by means of the key 71 and being free to move axially or longitudinally on the drive shaft 18 so that the left hand clutch pressure plate 70 can exert pressure on the assembly 32 of clutch discs as hereinafter described. The pressure plate 70 is provided with three left hand clutch drive pins 72 that are circumferentially spaced (at intervals of 120°) about the pressure plate, the drive pins 72 extending inwardly toward the sprocket 30 parallel to the axis of the drive shaft 18. Each drive pin 72 is firmly secured to the pressure plate 70 by means of a locking pin 73. A plurality of left hand drive annular clutch discs 74 are mounted on the left hand clutch drive pins 72, the clutch discs 74 being formed with openings 75 adapted to receive the drive pins 72 as shown best in FIG. 5 of the drawing. As a result, the clutch discs 74 are keyed to the pressure plate 70, the clutch discs being axially movable on the drive pins 72 and axially spaced apart from each other.

A left hand sprocket pressure plate 76 is mounted on the left hand end of the sprocket 30 and is secured thereto by means of the screws 77. Three left hand sprocket drive pins 78 extend longitudinally from the left hand end of the sprocket 30, each drive pin being secured to the sprocket by means of a bolt 79. The left hand sprocket drive pins 78 are circumferentially spaced (at intervals of 120°) about the sprocket 30, the drive pins 78 extending outwardly toward the pressure plate 70 parallel to the axis of the drive shaft 18 inside the inner periphery of the annular clutch discs 74. A plurality of left hand sprocket annular clutch discs 80 are mounted on the left hand sprocket drive pins 78, the clutch discs 80 being formed with openings 81 adapted to receive the drive pins 78 as shown best in FIG. 5 of the drawing. As a result, the clutch discs 80 are keyed to the sprocket 30, the clutch discs being axially movable on the drive pins 78 and being interleaved with the axially spaced and axially movable annular clutch discs 74 on the clutch drive pins 72.

In like manner, a right hand clutch pressure plate base member 84 and clutch pressure plate 85 are mounted on the right hand drive shaft 24, the pressure plate base member 84 being keyed to the drive shaft 24 by means of the key 86 and being free to move axially or longitudinally on the drive shaft 24 so that the right hand clutch pressure plate 85 can exert pressure on the assembly 34 of clutch discs as hereinafter described. The pressure plate 85 is provided with three right hand clutch drive pins 87 that are circumferentially spaced (at intervals of 120°) about the pressure plate, the drive pins 87 extending inwardly toward the sprocket 30 parallel to the axis of the drive shaft 24. Each drive pin 87 is firmly secured to the pressure plate 85 by means of a locking pin 88. A plurality of right hand drive annular clutch discs 89 are mounted on the right hand clutch drive pins 87, the clutch discs 89 being formed with openings 90 that are adapted to receive the drive pins 87, thereby keying the clutch discs to the pressure plate 85 in the manner previously described. The annular clutch discs 89 are axially movable on the drive pins 87 and are axially spaced apart from each other.

A right hand sprocket pressure plate 91 is mounted on the right hand end of the sprocket 30 and is secured thereto by means of the screws 92. Three right hand sprocket drive pins 93 extend longitudinally from the right hand end of the sprocket 30, each drive pin 93 being secured to the sprocket 30 by means of a bolt 94. The right hand sprocket drive pins 93 are circumferentially spaced (at intervals of 120°) about the sprocket 30, the drive pins 93 extending outwardly toward the pressure plate 85 parallel to the axis of the drive shaft 24 inside the inner periphery of the annular clutch discs 89. A plurality of right hand sprocket annular clutch discs 95 are mounted on the right hand sprocket drive pins 93, the clutch discs 95 being formed with openings adapted to receive the drive pins 93 so that the sprocket clutch discs 95 are keyed to the sprocket 30 and are axially movable on the sprocket drive pins 93. The clutch discs 95 are interleaved with the axially spaced and axially movable right hand annular clutch discs 89 on the clutch drive pins 87.

As previously mentioned, the assembly 32 of interleaved left hand clutch discs are frictionally engaged and disengaged by longitudinal movement of the left hand clutch control levers 36 and 37, and the assembly 34 of interleaved right hand clutch discs are frictionally engaged and disengaged by longitudinal movement of the right hand clutch control levers 38 and 39. The left hand clutch control levers 36 and 37 are pivotally mounted at one end on fixed pivot pin 100 that is mounted on pivot pin bracket 101 secured to the frame member 10, and are pivotally connected at their other end to movable pivot pin 102 mounted on the longitudinally movable left hand piston rod extension 103 of the double-acting air cylinder 40. Intermediate the pivot pins 100 and 102, the clutch control levers 36 and 37 are pivotally secured to left hand clutch pivot pins 104 and 105, respectively, that are mounted opposite each other on the annular left hand outer bearing collar 106. A ball bearing 107 connects the longitudinally movable but nonrotatable outer bearing collar 106 to the rotatable and longitudinally movable left hand clutch pressure plate 70 so that when the clutch control levers 36 and 37 are moved longitudinally by longitudinal movement of the piston rod extension 103 of the air cylinder 40, the outer bearing collar 106 and the pressure plate 70 will be moved longitudinally a proportionate amount.

In like manner, the right hand clutch control levers 38 and 39 are pivotally mounted at one end on fixed pivot pin 110 that is mounted on pivot pin bracket 111 secured to the frame member 11, and are pivotally connected at their other end to movable pivot pin 112 mounted on the longitudinally movable right hand piston rod extension 113 of the double-acting air cylinder 40. Intermediate the pivot pins 110 and 112, the levers 38 and 39 are pivotally secured to right hand clutch pivot pins 114 and 115, respectively, that are mounted opposite each other on the annular right hand outer bearing collar 116. A ball bearing 117 connects the longitudinally movable but non-rotatable outer bearing collar 116 to the rotatable and longitudinally movable right hand clutch pressure plate 85 so that when the clutch control levers 38 and 39 are moved longitudinally by longitudinal movement of the piston rod extension 113 of the air cylinder 40, the outer bearing collar 116 and the pressure plate 85 will be moved longitudinally a proportionate amount.

When the reversing mechanism of our invention is in operation, the main drive shaft 12 is rotated in a predetermined direction by a prime mover, and the sprocket 30 is connected by means of the belt 44 to the rotating part the direction of rotation of which is to be rapidly and repeatedly reversed. When the rotating part is to be rotated in the left hand direction, air is introduced into the left hand side of the double-acting air cylinder 40 thereby causing the left hand clutch control levers 36 and 37 to move the left hand pressure plate 70 forcibly against the assembly 32 of left hand clutch discs so that the sprocket 30 will be rotated in the left hand direction. At the same time the right hand clutch control levers 38 and 39 and the right hand pressure plate 85 connected thereto are moved away from the assembly 34 of right hand clutch discs so that the right hand clutch discs are frictionally disengaged. When the direction of rotation of the rotating part is to be reversed so that the part will rotate in the right hand direction, air is introduced into the right hand side of the air cylinder 40 thereby causing the right hand clutch control levers 38 and 39 to move the right hand pressure plate 85 forcibly against the assembly 34 of right hand clutch discs so that the sprocket 30 will be rotated in the right hand direction. At the same time, the left hand clutch control levers 36 and 37 and the left hand pressure plate 70 connected thereto are moved away from the assembly 32 of left hand clutch discs so that the left hand clutch discs are frictionally disengaged.

From the foregoing description of our new reversing mechanism it will be seen that we have made an important contribution to the art to which our invention relates.

We claim:

1. Apparatus for reversing the direction of rotation of a rotating part which comprises:
    a rotatably mounted main drive shaft adapted to be rotated in one direction by a prime mover;
    left hand drive means driven by said main drive shaft adapted to rotate a left hand drive shaft in one direction and right hand drive means driven by said main drive shaft adapted to rotate a right hand drive shaft in the opposite direction, the axes of rotation of said left hand and right hand drive shafts being in alignment with each other;
    a rotatably mounted sprocket disposed between said left hand drive shaft and said right hand drive shaft, the axis of rotation of said sprocket being in alignment with the axes of rotation of said drive shafts;
    left hand drive clutch means mounted on said left hand drive shaft adapted to frictionally engage cooperating left hand sprocket clutch means mounted on the left hand end of said sprocket;
    right hand drive clutch means mounted on said right hand drive shaft adapted to frictionally engage cooperating right hand sprocket clutch means mounted on the right end of said sprocket, said right hand clutch means comprises a right hand clutch pressure plate keyed to the right hand drive shaft and axially movable on said drive shaft, said pressure plate having a plurality of circumferentially spaced right hand clutch drive pins mounted on the inner surface of said pressure plate parallel to the axis of the drive shaft, and a plurality of right hand drive clutch discs keyed to the right hand clutch drive pins, said clutch discs being axially movable on said drive pins and being axially spaced from each other and in which the right hand sprocket clutch means comprises a right hand sprocket pressure plate mounted on the right hand end of said sprocket, said sprocket pressure plate having a plurality of circumferentially spaced right hand sprocket drive pins mounted on the right hand end of said sprocket parallel to the axis of the drive shaft, and a plurality of right hand sprocket clutch discs keyed to the right hand sprocket drive pins, said sprocket clutch discs being axially movable on said sprocket drive pins and being interleaved with the axially spaced right hand drive clutch discs;
    direction of rotation control means connected to the left hand drive clutch means and to the right hand drive clutch means, said direction of rotation control means being adapted to frictionally engage the left hand clutch means while disengaging the right hand clutch means and to frictionally engage the right hand clutch means while disengaging the left hand clutch means, whereby said sprocket rotates in the direction corresponding to the direction of rotation of the drive means and the associated clutch means placed in frictional engagement by said direction of rotation control means and means engaging the periphery of the sprocket and connected to said rotating part for reversing its direction of rotation.

2. Apparatus according to claim 1 in which the left hand drive shaft, the sprocket and the right hand drive shaft are rotatably mounted serially on a stationary bearing support shaft.

3. Apparatus according to claim 1 in which the direction of rotation control means comprises means for alternately moving the left hand clutch pressure plate forcibly towards the left hand sprocket pressure plate whereby the left hand drive and left hand sprocket clutch means are made to frictionally engage each other, and then moving the right hand clutch pressure plate forcibly towards the right hand sprocket pressure plate whereby the right hand drive and right hand sprocket clutch means are made to frictionally engage each other.

4. Apparatus for rapidly reversing the direction of rotation of a rotating part which comprises:
    a rotatably mounted main drive shaft adapted to be rotated in one direction by a prime mover;
    a first main drive gear mounted on said main drive shaft adjacent one end thereof and a second main drive gear mounted on said main drive shaft adjacent the opposite end thereof;
    a left hand drive gear in engagement with said first main drive gear, and a rotatably mounted left hand drive shaft on which said left hand drive gear is mounted;
    a rotatably mounted right hand idler gear in engagement with said second main drive gear;
    a right hand drive gear in engagement with said right hand idler gear, and a rotatably mounted right hand drive shaft on which said right hand drive gear is mounted;

a rotatably mounted sprocket disposed between said left hand drive shaft and said right hand drive shaft, the axes of rotation of said left hand drive shaft, sprocket and right hand drive shaft being in alignment with each other;

a left hand clutch pressure plate keyed to the left hand drive shaft and axially movable on said drive shaft, said pressure plate having a plurality of circumferentially spaced left hand clutch drive pins mounted on the inner surface of said pressure plate parallel to the axis of the drive shaft;

a plurality of left hand drive clutch discs keyed to the left hand clutch drive pins, said clutch discs being axially movable on said drive pins and being axially spaced from each other;

a left hand sprocket pressure plate mounted on the left hand end of said sprocket, said sprocket pressure plate having a plurality of circumferentially spaced left hand sprocket drive pins mounted on the left hand end of said sprocket parallel to the axis of the drive shaft;

a plurality of left hand sprocket clutch discs keyed to the left hand sprocket drive pins, said sprocket clutch discs being axially movable on said sprocket drive pins and being interleaved with the axially spaced left hand drive clutch discs;

a right hand clutch pressure plate keyed to the right hand drive shaft and axially movable on said drive shaft, said pressure plate having a plurality of circumferentially spaced right hand clutch drive pins mounted on the inner surface of said pressure plate parallel to the axis of the drive shaft;

a plurality of right hand drive clutch discs keyed to the right hand clutch drive pins, said clutch discs being axially movable on said drive pins and being axially spaced from each other;

a right hand sprocket pressure plate mounted on the right hand end of the sprocket, said sprocket pressure plate having a plurality of circumferentially spaced right hand sprocket drive pins mounted on the right hand end of said sprocket parallel to the axis of the drive shaft;

a plurality of right hand sprocket clutch discs keyed to the right hand sprocket drive pins, said sprocket clutch discs being axially movable on said sprocket drive pins and being interleaved with the axially spaced right hand drive clutch discs;

direction of rotation control means alternately adapted to move the left hand clutch pressure plate forcibly towards the left hand sprocket pressure plate whereby the left hand drive and left hand sprocket clutch discs are made to frictionally engage each other, and to move the right hand clutch pressure plate forcibly towards the right hand sprocket pressure plate whereby the right hand drive and right hand sprocket clutch discs are made to frictionally engage each other; and means engaging the periphery of the sprocket and connected to said rotating part for reversing its direction of rotation.

5. Apparatus according to claim 4 in which the left hand drive shaft, the sprocket and the right hand drive shaft are rotatably mounted serially on a stationary bearing support shaft.

References Cited

UNITED STATES PATENTS

| | | | |
|---|---|---|---|
| 1,576,190 | 3/1926 | Jackson | 192—69 |
| 2,547,732 | 4/1951 | Baker | 74—377 |
| 2,576,156 | 11/1951 | Trofimov | 74—377 |
| 2,832,451 | 4/1958 | Johansen | 74—376 |
| 3,071,021 | 1/1963 | Miller | 74—377 |
| 3,135,129 | 6/1964 | Merritt | 74—377 |

FRED C. MATTERN, JR, *Primary Examiner.*

DONELY J. STOCKING, *Examiner.*

H. S. LAYTON, *Assistant Examiner.*